Figure 1:
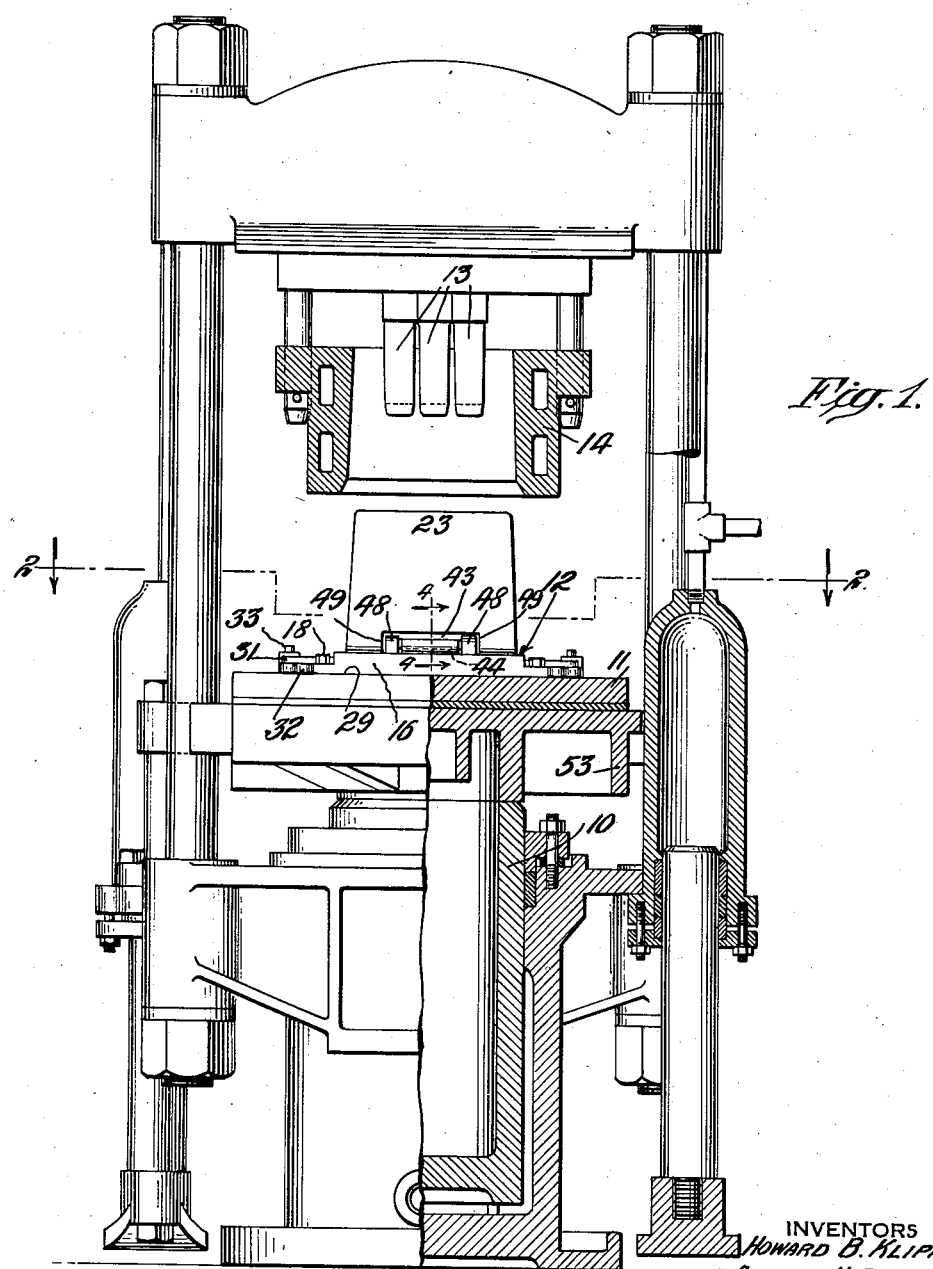

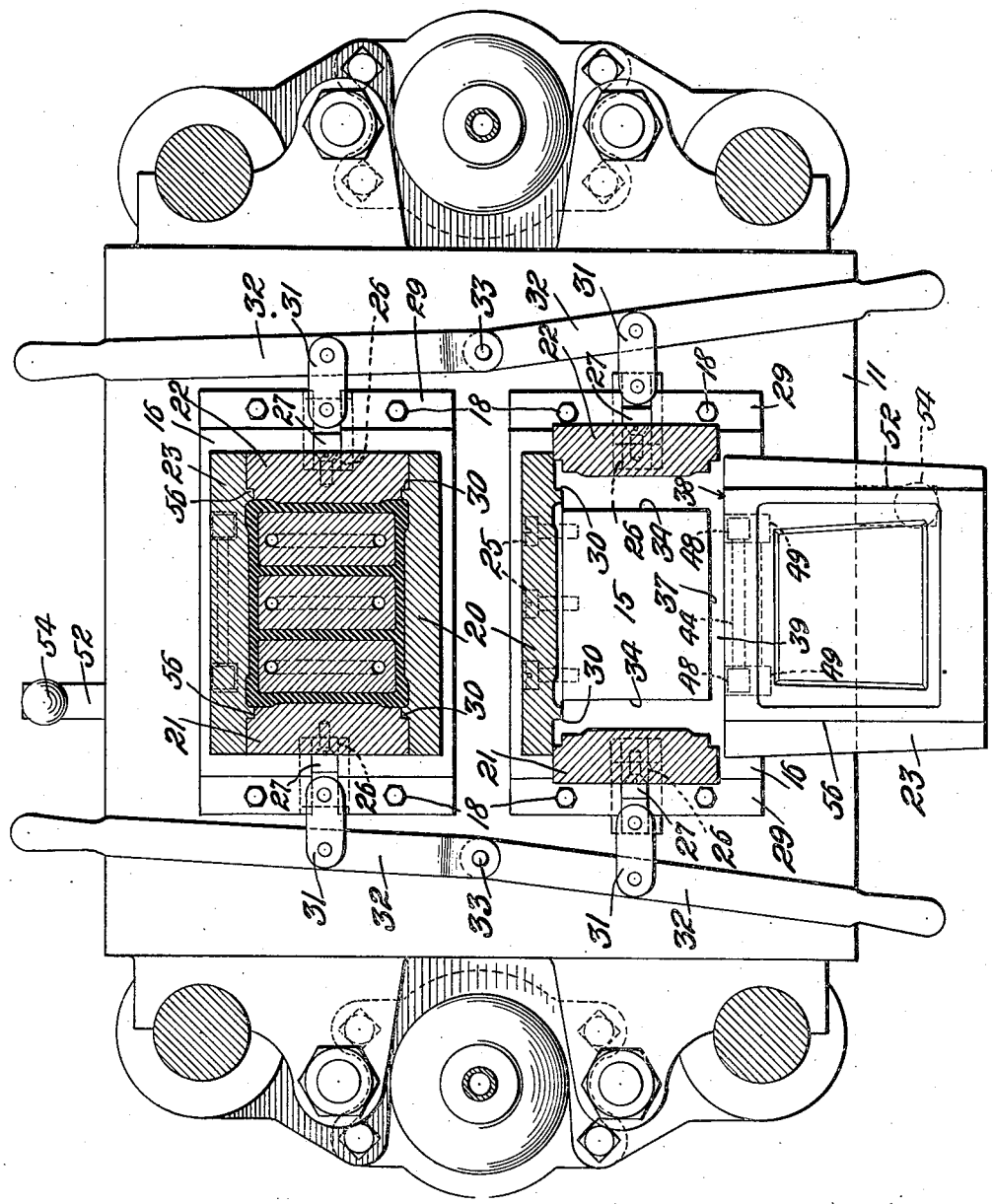

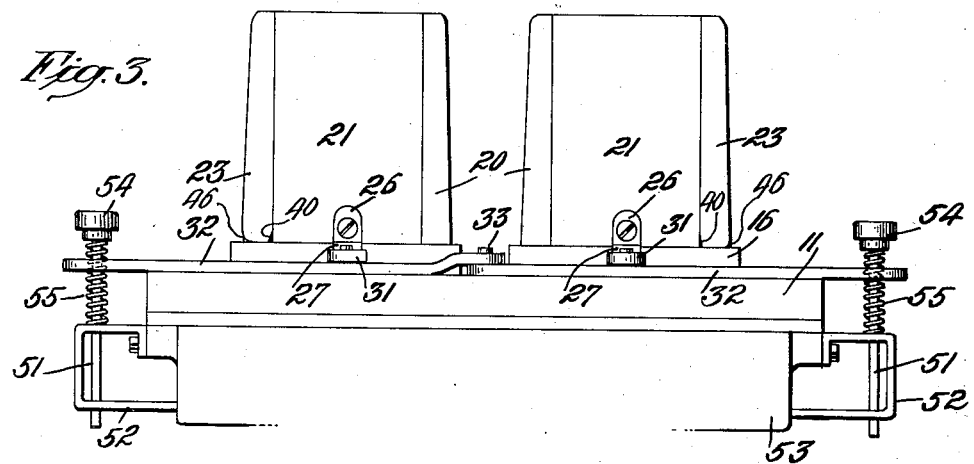
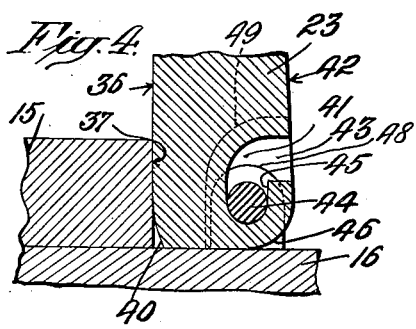
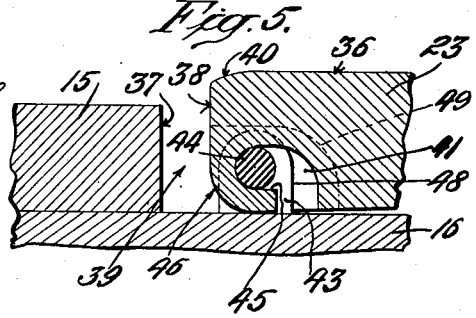
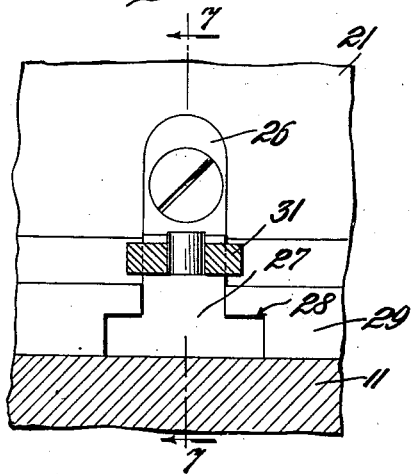
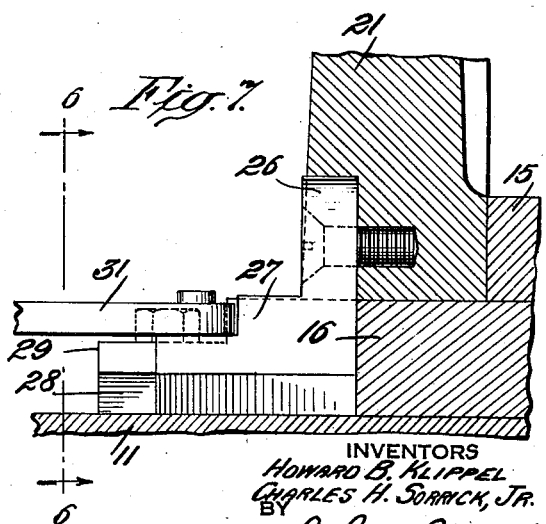

Patented June 14, 1938

2,120,282

UNITED STATES PATENT OFFICE 2,120,282

MOLD FOR PRESSES

Howard B. Klippel and Charles H. Sorrick, Jr., Akron, Ohio, assignors to American Hard Rubber Company, New York, N. Y., a corporation of New York Application March 24, 1936, Serial No. 70,604

4 Claims. (Cl. 18—34)

The invention relates to an improvement in press molds adapted for cooperation with a core or plunger to form or mold a mass of plastic material into hollow bodies of various shape, and is more particularly an improvement in molds especially adapted to form battery boxes or containers composed of hard rubber or asphaltic compounds.

Such molds usually comprise a rectangular bottom plate mounted horizontally on the bottom platen of the press, and four upright walls rising from the platen, or a plate thereon, at the four edges of the bottom plate and making tight joints with it and with each other. The rear wall is usually stationary and the other walls are usually movable to permit the ready removal of the molded article and the cleaning of the mold parts previous to the next molding operation. To form a battery box or container, a mass of compound is placed on the bottom plate, the movable mold walls are moved into closed or operative position, and the mold and core are brought together. It is common practise to use a little more compound than is necessary to produce a perfect container, with the result that the excess material squeezes out at the joints in the form of fins, known in the trade as the "flash". When the movable mold walls are moved to permit the removal of the molded battery container, very often portions of the fins are left in the open joints of the mold walls, and as these molds have heretofore been constructed, the ready removal of the residue fin parts has presented difficulties and the expenditure of unnecessary time was required to clean the joints thoroughly.

The object of the present invention is to provide an improved mold construction of the general character described above in which the movable front and side walls are so mounted that when they have been moved to inoperative or open position away from the stationary mold parts, the fins remaining in the open joints can be quickly removed and the joints readily and thoroughly cleaned. To the accomplishment of this end, the invention consists in the improved mold construction hereinafter fully described and particularly pointed out in the appended claims.

In the accompanying drawings illustrating the preferred form of the invention, Fig. 1 is a front elevation, partly in section, of so much of a hydraulic press of conventional design as is necessary to show the application of the improved mold thereto; Fig. 2 is an enlarged section taken on the line 2—2 of Fig. 1, but with the movable walls of the front mold shown in open or inoperative position; Fig 3 is an end elevation of the two molds and the adjacent parts of the press; Fig. 4 is a transverse sectional detail of the pivotal mounting of the lower part of the front mold wall, which is shown in upright or operative position; Fig 5 is a view similar to Fig. 4, but with the front wall in inoperative or substantially horizontal position; Fig. 6 is a section taken on the line 6—6 of Fig. 7; and Fig. 7 is a section taken on the line 7—7 of Fig. 6.

The hydraulic press on which the improved mold construction is mounted is of well known construction and needs no detailed description. It comprises briefly a ram 10 which carries on its upper end a horizontally disposed platen 11 on which the mold construction, generally indicated at 12, is mounted. These presses are usually provided with two molds, as shown in Fig. 2. When the mold parts are in closed or operative position, as shown in the upper part of Fig. 2, and the battery box is to be formed, the ram rises and carries the mold into cooperative relation with the core 13 and the steam jacket 14. The mold surrounds the core and is surrounded by the jacket which assists in effecting the vulcanization of the battery box.

The improved mold construction comprises a rectangular bottom plate 15 resting on a plate 16 which is secured to the platen 11 by the bolts 18, and four upright walls: a stationary rear wall 20, two slidable end walls 21 and 22 and a pivoted front wall 23. The rear wall rises from the plate 16 and is secured in position by means of the cap screws 25 which pass into the rear edge or surface of the bottom plate 15, as shown in Fig. 2, to form a permanent tight joint with it.

The slidable side walls 21 and 22 rest at their lower edges on the outer ends of the plate 16. The outer surface of the lower part of each end wall is provided at its middle point with a recess to accommodate the upright part 26 of a block in the form of an angle iron, the horizontal part 27 of which slides in a T-groove 28 cut in the end part 29 of each plate 16. Each angle-iron block is connected by a link 31 with a lever or handle 32 pivoted at its inner end 33 on the platen 11. By manipulating the handles 32 the end walls are moved toward and away from the ends 34 of the bottom plate 15. This sliding of the end walls away from the bottom plate and the shoulders 30 of the rear wall permits the ready removal of the flash at these points.

The front wall 23 is so mounted that when it is in upright, operative position, as shown in Fig. 4, the rear surface 36 thereof forms a tight joint with the front edge or surface 37 of the bottom plate 15, but when it is in open or substantially horizontal position, as shown in Fig. 5, the bottom edge or surface 38 of the front wall is separated from the front edge 37 of the plate 15 by a substantial space 39, thereby permitting the ready and easy removal of the fin or the fragments thereof which might be left at this point when the freshly molded battery box has been removed from the mold.

This mode of operation of the front wall 23 is effected by the following construction: The middle section of the lower part of the front wall is provided with an elongated pivot hole or slot 41 parallelly arranged with the bottom edge 38 of the front wall, the major or vertical axis of the slot being substantially parallel with the rear surface 36 of the front wall, as seen in Fig. 4. The slot 41 opens into the front surface 42 of the front wall by an aperture 43 slightly larger than the pivot pin or rod 44 which is normally engaged by the pivot hole proper, that is to say, the lower part 45 of the pivot slot. The center of the pivot hole proper 45 is substantially the same distance from the front surface of the front wall as it is from the bottom edge or surface and the bottom front corner 46 of the wall is rounded on this radius so that the front wall may rock on this rounded surface as it is swung into and out of closed or operative position. The lower rear corner 40 of the front wall is also rounded to permit it to clear the front edge of the plate 15 as the wall is swung into and out of closed position. The required width of the opening 39 between the front edge 37 of the plate 15 and the bottom edge 38 of the front wall when the latter is in open position, determines how much farther the rear surface of the front wall shall be from the pivot point than the front surface of the wall is, in order that tight joints between the parts may be obtained when the front wall is in closed position, as shown in Fig. 4.

The pivot rod 44 is fixed at each end in a boss 48 rising from the front edge of the plate 16. The two bosses 48 are received in recesses 49 cut in the lower front corner of the front wall. When the front wall is in open position, which is substantially horizontal, the wall rests on a stop pin 51 loosely mounted in a bracket 52 secured to the press part 53 which supports the platen 11. The head 54 of the stop pin is yieldingly supported by a coiled spring 55 so as to cushion the impact when the front wall is swung into open position.

Assuming the mold parts to be in open or inoperative position, as shown in the lower part of Fig. 2, the mold is prepared for the battery box forming operation by placing the proper amount of hard rubber or other compound on the bottom plate 15. The end walls 21 and 22 are then slid inwardly to the position shown in the upper part of Fig. 2. It will be observed that the inner surfaces of the outer ends of the stationary rear wall overlap the inner ends of the end walls, and that the end walls at this point are provided with a shoulder corresponding to the shoulder 30. The front wall is next swung upwardly and inwardly to the position shown in the upper part of Fig. 3 and in Fig. 4, with the inner surfaces of its outer ends overlapping the outer ends of the end walls, which are provided with shoulders at this point to cooperate with shoulders 56 on the rear surface of the front wall. The mold is now in condition for the molding operation which is accomplished by raising the mold into cooperation with the core 13. When the battery box or container has been formed and vulcanized, the platen 11 and mold descend in the customary manner. The operator releases the battery box by first tentatively pushing outwardly on the outer ends of the handles 32 to disengage carefully the end walls from the battery box, and the contact at this point having been broken the end walls are moved outwardly to their full extent. The operator then fully releases the battery box by first thumping outwardly on the upper edge of the front wall to free it from the box, and then swings the front wall downwardly, which action aids in loosening the contact of the bottom and rear sides of the battery box with the bottom and rear walls of the mold. The battery box may now be readily removed from the mold. The cleaning of the joints by removing the fins and fragments left in them is expeditiously accomplished as will be readily appreciated by examining Fig. 2.

If it is necessary to remove the front wall, that is done by swinging the wall in open position and then sliding it inwardly until its lower edge contacts with the front edge of the plate 15. This brings the aperture 43 into alinement with the pivot rod 44. The wall is removed by lifting up on its now inner end. The end walls can also be readily removed by disconnecting the handle parts therefrom and then sliding them outwardly.

Having thus described the invention, what we claim as new is:—

1. A mold for presses of the character described having a platen, said mold comprising a bottom plate mounted on the platen, a stationary rear wall, two end walls slidable into and out of operative position, and a front wall, said walls rising from the edges of the bottom plate to form tight joints at their lower edges therewith when in operative molding position, said front wall being pivoted at its lower end at a point below the top surface of the bottom plate and its lower edge engaging the platen when said wall is in upright position, the pivot point of said front wall being nearer the front surface of the front wall than the rear surface thereof and being substantially the same distance from the bottom edge of the front wall as it is from the front surface thereof, the lower front and rear corners of the front wall being rounded so that the front wall may be swung outwardly and downwardly away from the front edge of the bottom plate.

2. A mold for presses of the character described having a platen, said mold comprising a bottom plate mounted on the platen, a stationary rear wall, two end walls slidable into and out of operative position and a front wall, the lower edge of the front wall being engaged with the platen when the wall is in upright position and the lower part of said front wall being provided with a pivot hole located nearer the front surface of the wall than the rear surface thereof and being substantially as far from the bottom edge of the wall as it is from the front surface thereof, so that as the front wall is swung outwardly and downwardly it moves away from the front edge of the bottom plate and provides a space therebetween, and a pivot pin on which the front wall is mounted, the front and rear bottom corners of the front wall being rounded to permit the wall to swing into and out of closed position, said pivot hole being elongated in the direction of the length of the front wall whereby the latter may be slidably shifted toward and away from the front edge of the bottom plate when the front wall is in horizontal position.

3. A mold for presses of the character described having a platen, said mold comprising a bottom plate mounted on the platen, and four upright walls including, a rear wall in fixed relation with the bottom plate, two end walls slidable into and out of operative relation with the bottom plate, and a front wall pivoted at its lower edge so as to be swung outwardly and downwardly away from the other walls, the pivotal mounting of the front wall being constructed and arranged to permit the front wall to be slid toward and away from the front edge of the bottom plate when the front wall is in open horizontal position.

4. A mold for presses of the character described having a platen, said mold comprising a bottom plate mounted on the platen, and four upright walls including a front wall pivoted at its lower part below the upper surface of the bottom plate, the pivot point of said front wall being substantially equi-distant from the front surface of the front wall and the lower edge thereof, said distance being less than the distance from the pivot point to the rear surface of the front wall, and a horizontal pivot pin on which the front wall is pivoted, said lower part of the front wall having an elongated pivot slot and a horizontal slot in the front surface of the wall to permit the front wall when it is in substantially horizontal position to be moved inwardly toward the bottom plate and then upwardly to disengage the front wall from the pivot pin.

HOWARD B. KLIPPEL.
CHARLES H. SORRICK, Jr.